Jan. 5, 1960   H. H. VAN ABBE ET AL   2,920,258
VOLTAGE ARRANGEMENT
Filed Jan. 9, 1956
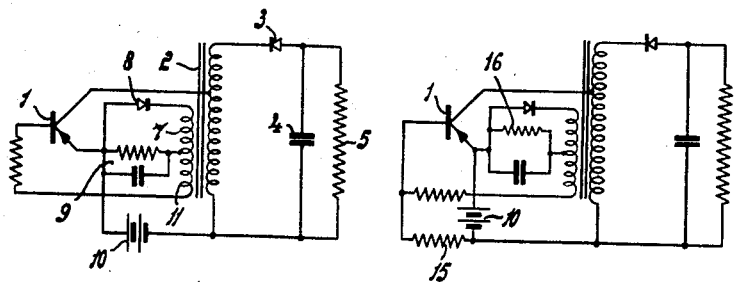
Fig.1    Fig.2
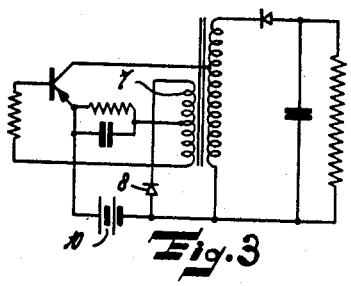 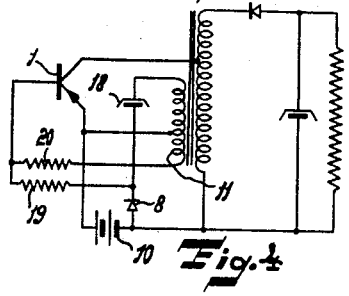
Fig.3    Fig.4
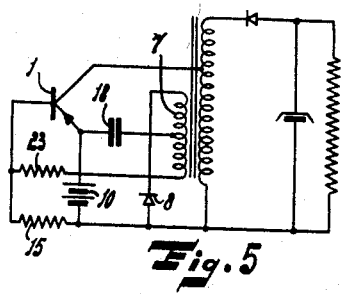 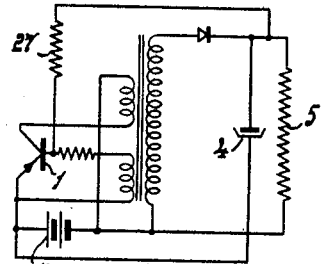
Fig.5    Fig.6
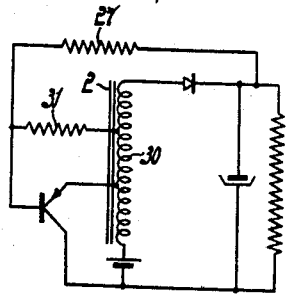 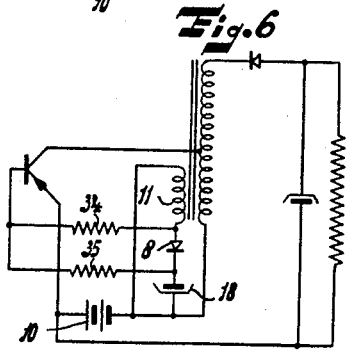
Fig.7    Fig.8
INVENTORS
HENRI H. VAN ABBE
JACOBUS J. RONGEN
BY
AGENT

United States Patent Office 2,920,258
Patented Jan. 5, 1960

2,920,258

VOLTAGE ARRANGEMENT

Henri Herman van Abbe and Jacobus Johannes Rongen, Eindhoven, Netherlands, assignors, by mesne assignments, to North American Philips Company, Inc., New York, N.Y., a corporation of Delaware Application January 9, 1956, Serial No. 558,152

Claims priority, application Netherlands January 13, 1955

5 Claims. (Cl. 321—2)

The invention relates to a circuit arrangement for stabilizing a pulsatory voltage, which is produced by means of a transistor caused to generate by aperiodic transformer feed-back. Such a generator arrangement may, for example, be used for converting a direct supply voltage to be supplied to a load from a low value into a high value. However, this often gives rise to the difficulty that upon a variation in the load or in the transistor properties, for example due to temperature fluctuations or to exchange, the pulsatory voltage produced varies.

The invention provides a simple means to reduce this difficulty. It is characterized in that the pulsatory voltage produced, subsequent to rectification and smoothing, is supplied in reverse direction to the emitter-base circuit of the transistor.

In order that the invention may be readily carried into effect, it will now be described with reference to the accompanying drawing, wherein:

Fig. 1 is a schematic diagram of an embodiment of the circuit arrangement of the present invention;

Fig. 2 is a modification of the embodiment of Fig. 1;

Fig. 3 is a further modification of the embodiment of Fig. 1;

Fig. 4 is a modification of the embodiment of Fig. 3;

Fig. 5 is a modification of the embodiment of Fig. 3;

Fig. 6 is a schematic diagram of another embodiment of the circuit arrangement of the present invention;

Fig. 7 is a modification of the embodiment of Fig. 6; and

Fig. 8 is a modification of the embodiment of Fig. 4.

The circuit arrangement shown in Fig. 1 comprises a transistor 1 of the pnp-type, which produces high voltage pulses by means of aperiodic feed-back by way of a transformer 2, these pulses being supplied via a rectifier 3 to a load 5, shunted by a capacitor 4. The amplitude of these voltage pulses appears to be liable to variation.

In order to stabilize the amplitude of the voltage pulses, the pulses produced across a winding 7 of the transformer 2 are converted, in accordance with the invention, via a rectifier 8 with a smoothing filter 9, into a control-voltage operative between the emitter and the base. The sense of winding of the winding 7 and the polarity of the rectifier 8 are chosen to be such that this control-voltage is operative in a direction opposite the pass direction of these electrodes (reverse direction), so that at an increase in amplitude of the voltage pulses the base has a higher positive bias voltage with respect to the emitter, the said increase in amplitude of the voltage pulses being thus counteracted. A completely analogous circuit arrangement is obtained, if the conductivity type of the transistor 1 and the polarity of the rectifiers 3 and 8 and of the voltage supply source 10 are reversed. A higher relative variation of the control-voltage operative between the emitter and the base at a variation in pulse amplitude, and hence a greater voltage stabilization is obtained, if a forward voltage is, in addition caused to operate in the emitter-base circuit. This may be accomplished for example, by connecting the negative terminal of the supply source 10 (Fig. 2) via a resistor 15 to the base electrode of the transistor 1. This, moreover, facilitates the starting of the generation of the arrangement. It may also be accomplished by connecting a threshold voltage in series with the rectifier 8, for example, by connecting the winding 7 (Fig. 3) via the rectifier 8 to the negative terminal of the supply source 10. The supply source 10 then operates as a threshold voltage source. The resistor 16 of Fig. 2 may, if desired, be dispensed with.

In the circuit arrangements shown in Figs. 1 and 3 the base current of the transistor 1 contributes to an important extent to the production of the voltage across the filter 9. In order to ensure, nevertheless, that this voltage is determined mainly only by the height of the voltage pulses produced, the mean current passing through the winding 7 had to exceed the mean base current, which would imply frequently excessive losses in the arrangement. Fig. 4 shows a variant of the embodiment shown in Fig. 3, in which this drawback is mitigated in that the control-voltage produced across the capacitor 18 is supplied in parallel with the pulsatory voltage across the winding 11 via separation resistors 19 and 20 to the base electrode of the transistor 1, so that this capacitor 18 is connected apart from the rectifying circuit constituted by the emitter-base path of the transistor 1. A variant similar to that shown in Fig. 1 is obtained, if the rectifier 8 of Fig. 4 is connected not to the negative, but to the positive terminal of the supply source 10.

Fig. 5 shows a variant of the arrangement shown in Fig. 3, in which this disadvantage is also mitigated in that the base electrode is connected, in the manner shown in Fig. 2, via the resistor 15 to the negative terminal of the supply source 10. By rectifying the voltage pulses produced across the winding 7 with the aid of the rectifier 8, a control-voltage is produced across the capacitor 18. The control voltage is also supplied through the resistor 23 also to the base electrode. The adjustment being correct, the base current will be provided mainly via the resistor 15 by the supply source 10. Nevertheless, upon a variation of the control-voltage across the capacitor 18, via the resistor 23, which may be materially smaller than the resistor 15, an important subsequent control of the base current and hence of the pulses produced may be introduced.

Fig. 6 shows a variant, in which the voltage produced across the load 5 and smoothed by means of the capacitor 4 is supplied as a control-voltage via the resistor 27 to the base electrode of the transistor 1. In this arrangement the rectifier 8 with the filter 9 shown in Fig. 1 are eliminated at the expense of a lower current available for the load 5. The starting of the generation is facilitated in this arrangement, since the lower side of the capacitor 4 is connected to the positive terminal of the supply source 10, so that at the beginning of the oscillation period of the oscillator the capacitor 4 does not take charging current.

Fig. 7 shows a further variant, comprising a resistor 27, similar to that shown in Fig. 6. The emitter is connected in this case to a tapping point of the winding 30 of the transformer 2 and the base electrode is connected via a resistor 31 to another tapping point of said winding, in order to provide the aperiodic feed-back required for the generation. These measures yield an arrangement comprising a very small number of circuit elements.

Fig. 8 finally shows a variant, in which the emitter-base feed-back winding 11 produces, in addition, the pulses to produce the control-voltage across the capacitor 18 by means of the rectifier 8. The two terminals of the rectifier 8 are connected via separation resistors 34 and 35 to the base electrode of the transistor 1. By connecting one end of this winding 11 to the negative terminal of the supply source 10, the oscillation of the arrangement is facilitated. If the winding 11 is, however, connected to the positive terminal of the supply source 10, the losses in the arrangement will be reduced.

What is claimed is:

1. A circuit arrangement comprising a junction transistor having emitter, collector and base electrodes, a voltage source for energizing said transistor, transformer means comprising a first winding portion and a second winding portion interconnecting said electrodes in aperiodic feedback relationship thereby to produce a pulse generating system, said first winding portion being connected in series circuit arrangement with said voltage source between the emitter and collector electrodes of said transistor and said second winding portion being connected to the base electrode of said transistor, means comprising a first base circuit branch for applying an initial bias voltage to said base electrode, means for deriving voltage pulses from said pulse generating system and for comparing them with the voltage of said voltage source to produce a resultant difference voltage, means for rectifying and smoothing said difference voltage to produce a resultant control voltage, and means comprising a second base circuit branch in parallel with said first base circuit branch for applying said control voltage to said base electrode in a direction opposite to the forward conducting direction of said transistor.

2. A circuit arrangement comprising a junction transistor having emitter, collector and base electrodes, a voltage source for energizing said transistor, transformer means comprising a first winding portion and a second winding portion interconnecting said electrodes in aperiodic feedback relationship thereby to produce a pulse generating system, said first winding portion being connected in series circuit arrangement with said voltage source between the emitter and collector electrodes of said transistor and said second winding portion being connected to the base electrode of said transistor, means comprising a first base circuit branch for applying an initial bias voltage derived from said voltage source to said base electrode in the forward conducting direction of said transistor, means for deriving voltage pulses from said pulse generating system and for comparing them with the voltage of said voltage source to produce a resultant difference voltage, means for rectifying and smoothing said difference voltage to produce a resultant control voltage, and means comprising a second base circuit branch in parallel with said first base circuit branch for applying said control voltage to said base electrode in a direction opposite to the forward conducting direction of said transistor.

3. A circuit arrangement as claimed in claim 1, wherein said first base circuit branch includes said second winding portion of said transformer.

4. A circuit arrangement as claimed in claim 2, wherein said first base circuit branch includes the series combination of a first separation resistor and said voltage source and said second parallel base circuit branch includes the series combination of a second separation resistor, said second winding portion and a pulse smoothing capacitor.

5. A circuit arrangement comprising a junction transistor having emitter, collector and base electrodes, a voltage source for energizing said transistor, transformer means comprising a first winding portion and a second winding portion interconnecting said electrodes in aperiodic feedback relationship thereby to produce a pulse generating system, said first winding portion being connected in series circuit arrangement with said voltage source between said emitter and collector electrodes and said second winding portion being connected to said base electrode through a first separation resistor, said voltage source being connected in series with said second winding portion and said first separation resistor to apply an initial bias voltage to said base electrode in the forward conducting direction of said transistor, means for deriving voltage pulses from said pulse generating system, a rectifier and a smoothing capacitor connected in series across said second winding portion to produce a control voltage and means comprising a second separation resistor connected between said base electrode and the junction point of said rectifier and said smoothing capacitor for applying said control voltage to said base electrode in a direction opposite to the forward conducting direction of said transistor.

References Cited in the file of this patent

UNITED STATES PATENTS

| | | |
|---|---|---|
| 2,757,243 | Thomas | July 31, 1956 |
| 2,761,909 | Wallace | Sept. 4, 1956 |
| 2,780,767 | Janssen | Feb. 5, 1957 |
| 2,791,739 | Light | May 7, 1957 |
| 2,810,080 | Trousdale | Oct. 15, 1957 |

FOREIGN PATENTS

| | | |
|---|---|---|
| 728,024 | Great Britain | Apr. 13, 1955 |